(12) United States Patent
Martin

(10) Patent No.: US 12,114,649 B2
(45) Date of Patent: Oct. 15, 2024

(54) FISHING BAIT FORMING ASSEMBLY AND METHOD

(71) Applicant: Max Martin, Brownfield, TX (US)

(72) Inventor: Max Martin, Brownfield, TX (US)

(*) Notice: Subject to any disclaimer, the term of this patent is extended or adjusted under 35 U.S.C. 154(b) by 7 days.

(21) Appl. No.: 18/112,596

(22) Filed: Feb. 22, 2023

(65) Prior Publication Data
US 2024/0276962 A1   Aug. 22, 2024

(51) Int. Cl.
*A01K 85/00* (2006.01)
*A01K 97/04* (2006.01)

(52) U.S. Cl.
CPC .......... *A01K 85/1897* (2022.02); *A01K 97/04* (2013.01)

(58) Field of Classification Search
CPC ... A01K 85/1897; A01K 97/04; A01K 97/045
See application file for complete search history.

(56) References Cited

U.S. PATENT DOCUMENTS

| | | | |
|---|---|---|---|
| 2,458,671 A | | 1/1949 | Zirbel |
| 2,846,803 A | * | 8/1958 | Rettig ............. A01K 97/04 43/4 |
| 3,964,201 A | * | 6/1976 | Biliunas ........... A01K 97/18 43/4 |
| 3,976,413 A | | 8/1976 | Popeil |
| 4,850,129 A | * | 7/1989 | Hoepfner .......... A01K 97/04 124/37 |
| 5,117,571 A | | 6/1992 | Sites |
| 2004/0093784 A1 | * | 5/2004 | Brahm ............. A01K 97/04 43/4 |

* cited by examiner

*Primary Examiner* — Richard G Davis

(57) ABSTRACT

A fishing bait forming assembly and method for facilitating baiting gelatinous bait includes a housing enclosing an interior space and having an interior surface and an exterior surface. The housing is elongated from a first end to a second end, and the first and second ends are open. A bait form is mounted to the housing and compresses a portion of the gelatinous bait to form a compacted bait mass. A hook slot extends through the first end of the housing and through the exterior surface and the interior surface of the housing.

5 Claims, 6 Drawing Sheets

FISHING BAIT FORMING ASSEMBLY AND METHOD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fishhook baiters and more particularly pertains to a new fishhook baiter for facilitating baiting gelatinous bait.

(2) Description of Related Art Including Information Disclosed Under 37 CFR 1.97 and 1.98

The prior art relates to fishhook baiters and includes a variety of fishhook baiters having a housing to hold fish bait. Known prior art does not adequately form non-solid fishing bait into a compressed mass that further facilitates the engagement of the mass with a fishhook.

BRIEF SUMMARY OF THE INVENTION

An embodiment of the disclosure meets the needs presented above by generally comprising a housing enclosing an interior space and having an interior surface and an exterior surface. The housing is elongated from a first end to a second end, wherein the first and second ends are open. A bait form is mounted to the housing and is configured for compressing a portion of a gelatinous bait to form a compacted bait mass. A hook slot extends through the first end of the housing and through the exterior surface and the interior surface of the housing to facilitate hooking the bait mass on a fishhook.

Another embodiment of the disclosure includes comprises a method including the steps of extending a mold outwardly of a housing and into gelatinous bait to capture and compress a portion of the gelatinous bait into a compacted bait mass. The mold is retracted inwardly of the housing and a fishing hook is positioned such that the fishing hook extends into the housing and is directed toward the compacted bait mass. The mold extends toward the fishing hook to engage the compacted bait mass with the fishing hook and the compacted bait mass is removed from the mold with the fishing hook, wherein the compacted bait mass is retained on the fishing hook.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
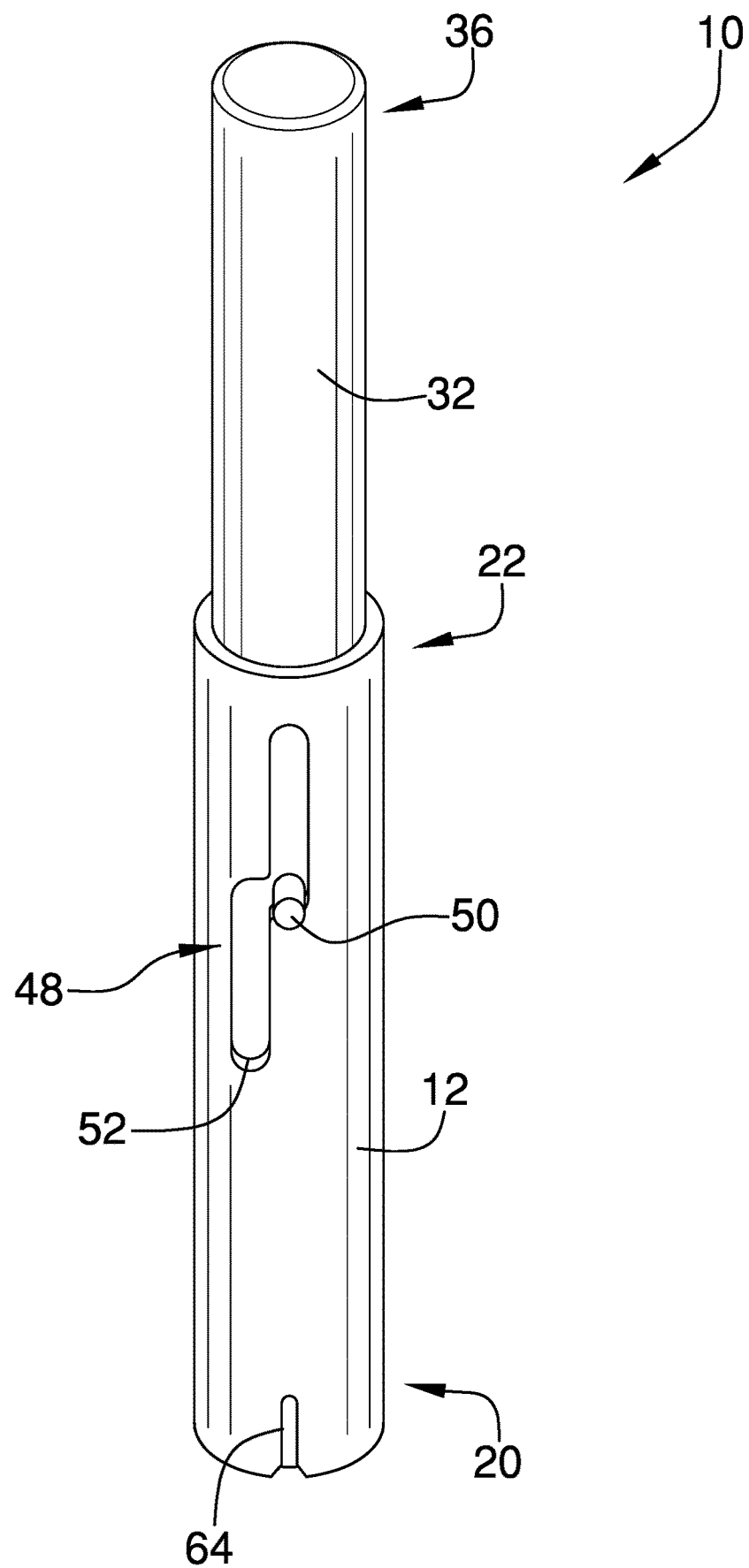
FIG. 1 is a front isometric view of a fishing bait forming assembly and method according to an embodiment of the disclosure.
Figure 2:
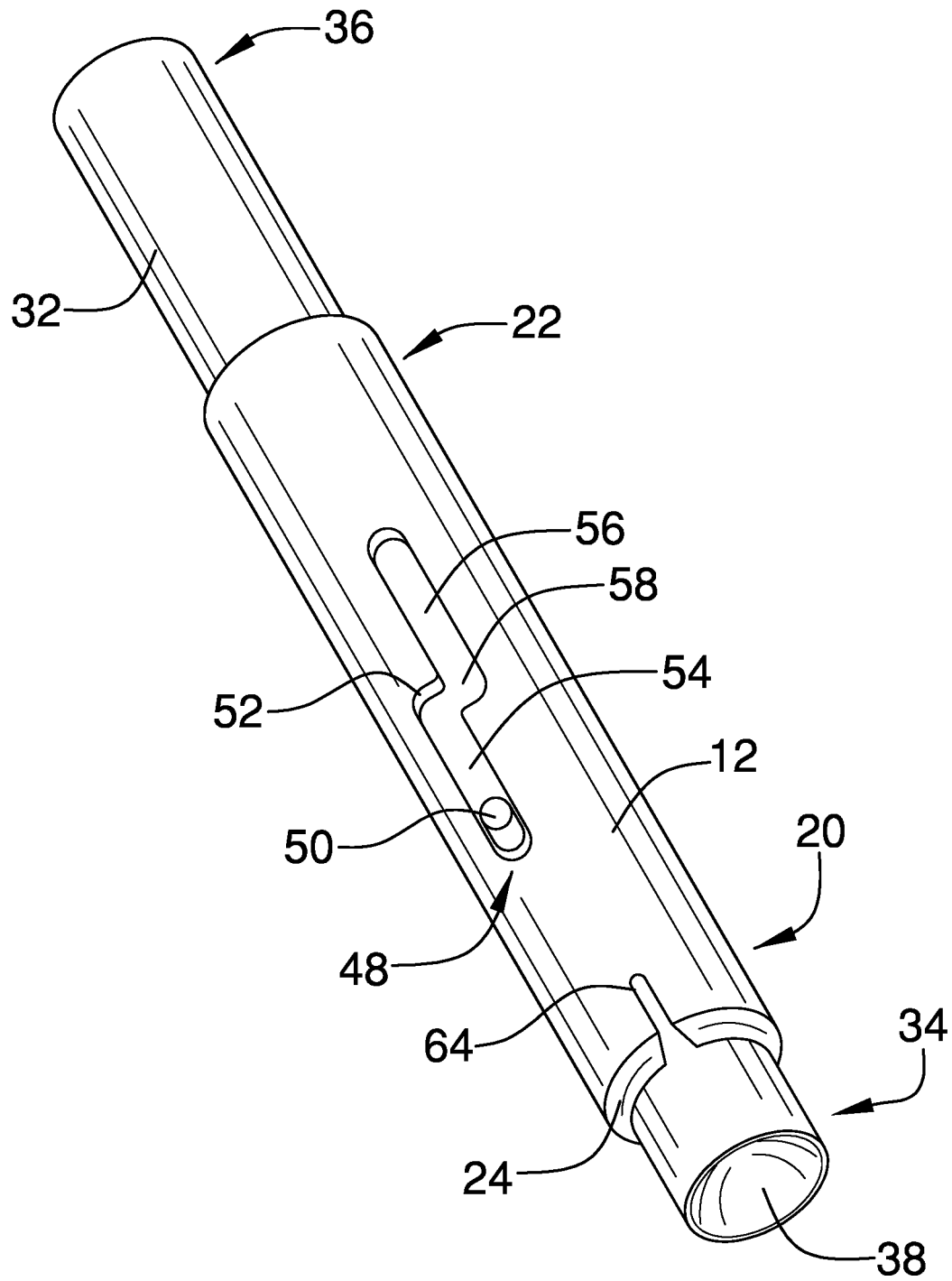
FIG. 2 is a bottom isometric view of an embodiment of the disclosure.
Figure 3:
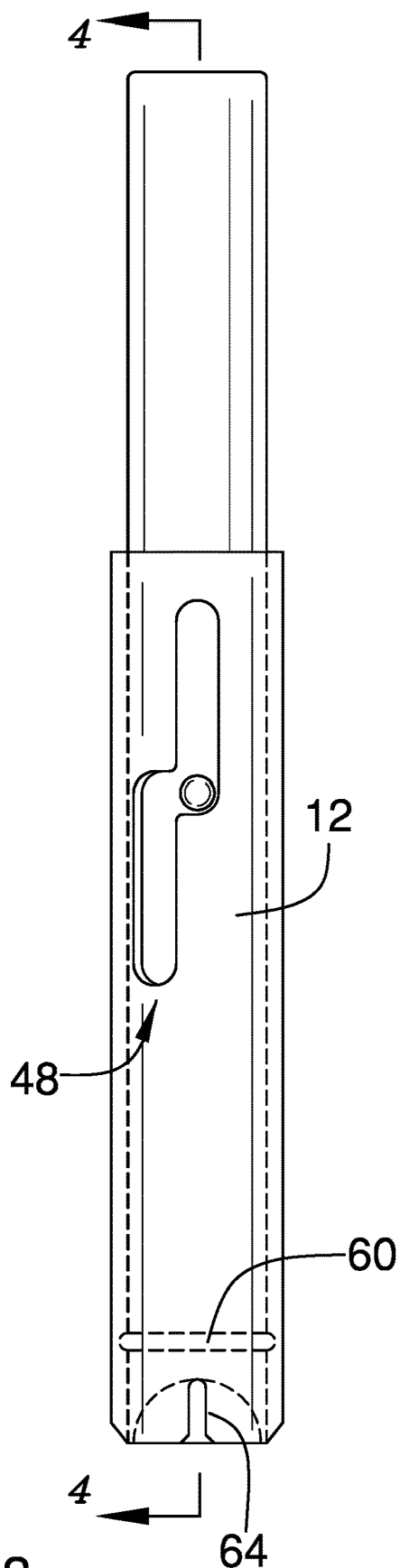
FIG. 3 is a front view of an embodiment of the disclosure.
Figure 4:
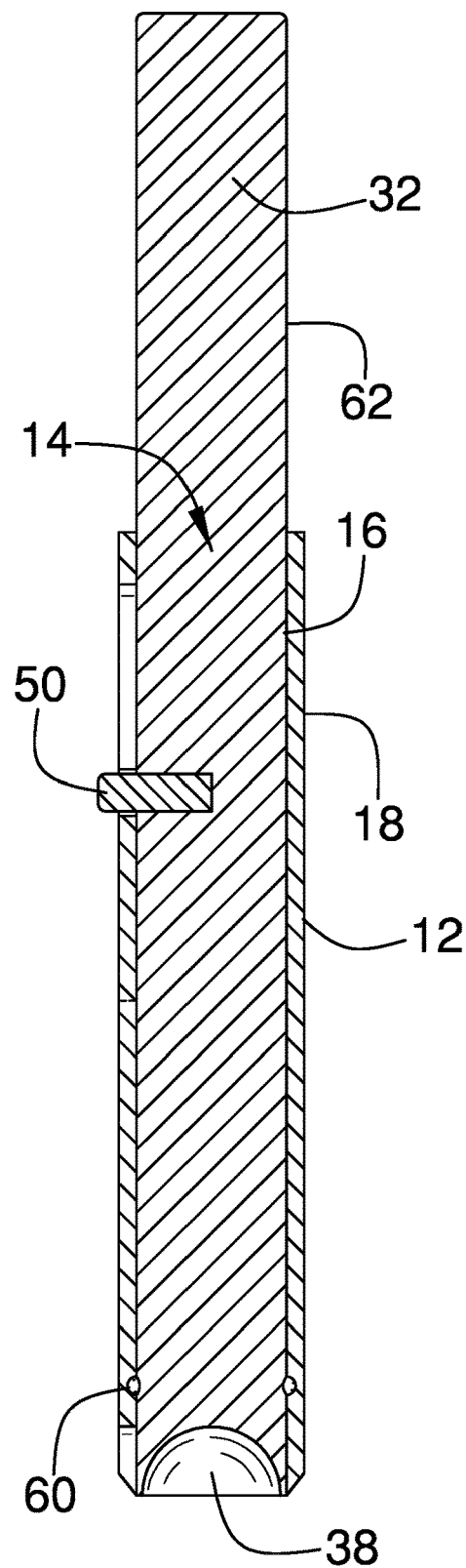
FIG. 4 is a cross-sectional view of an embodiment of the disclosure take along Line 4-4 of FIG. 3.
Figure 5:
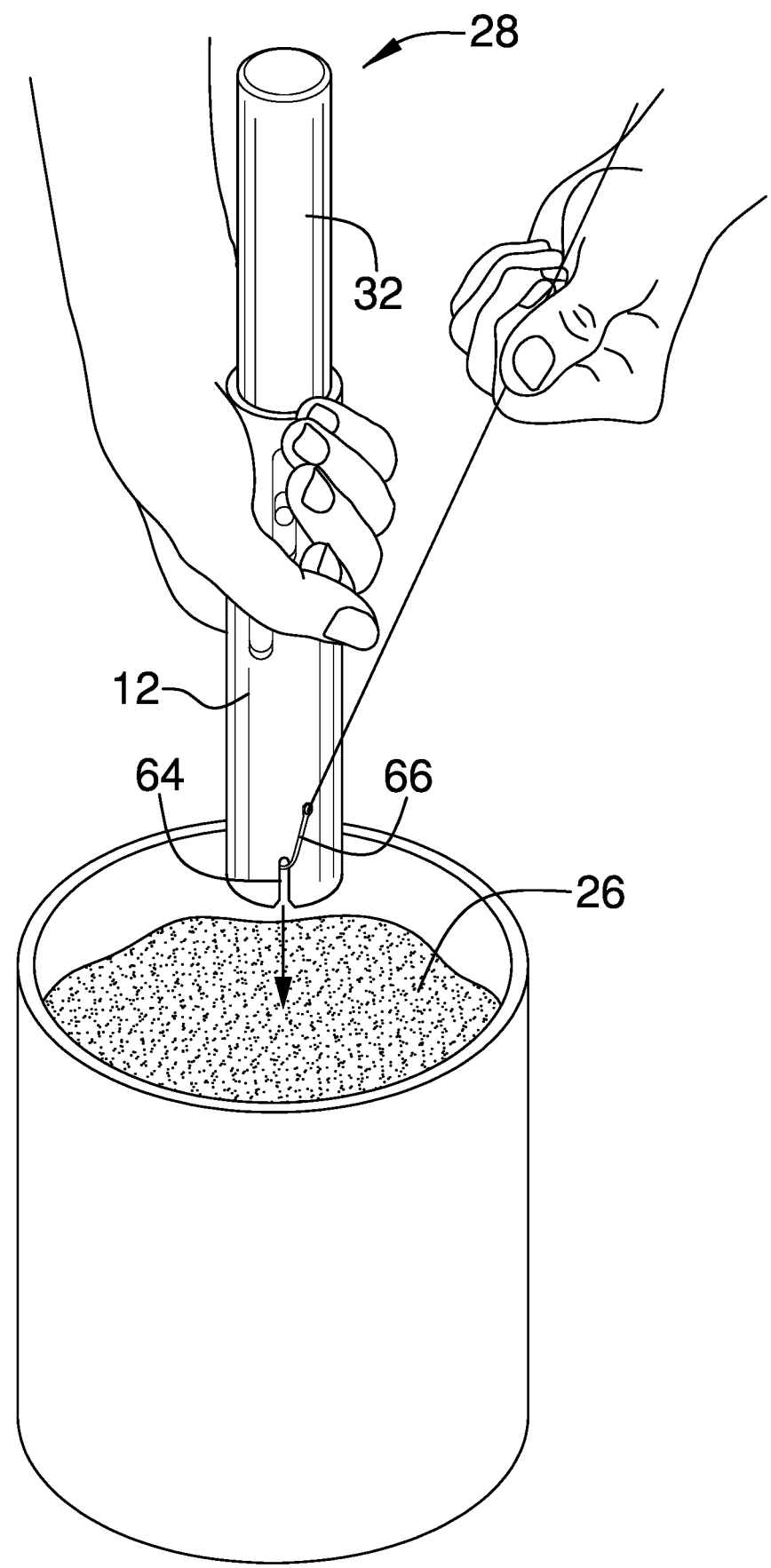
FIG. 5 is an in-use view of an embodiment of the disclosure.
Figure 6:
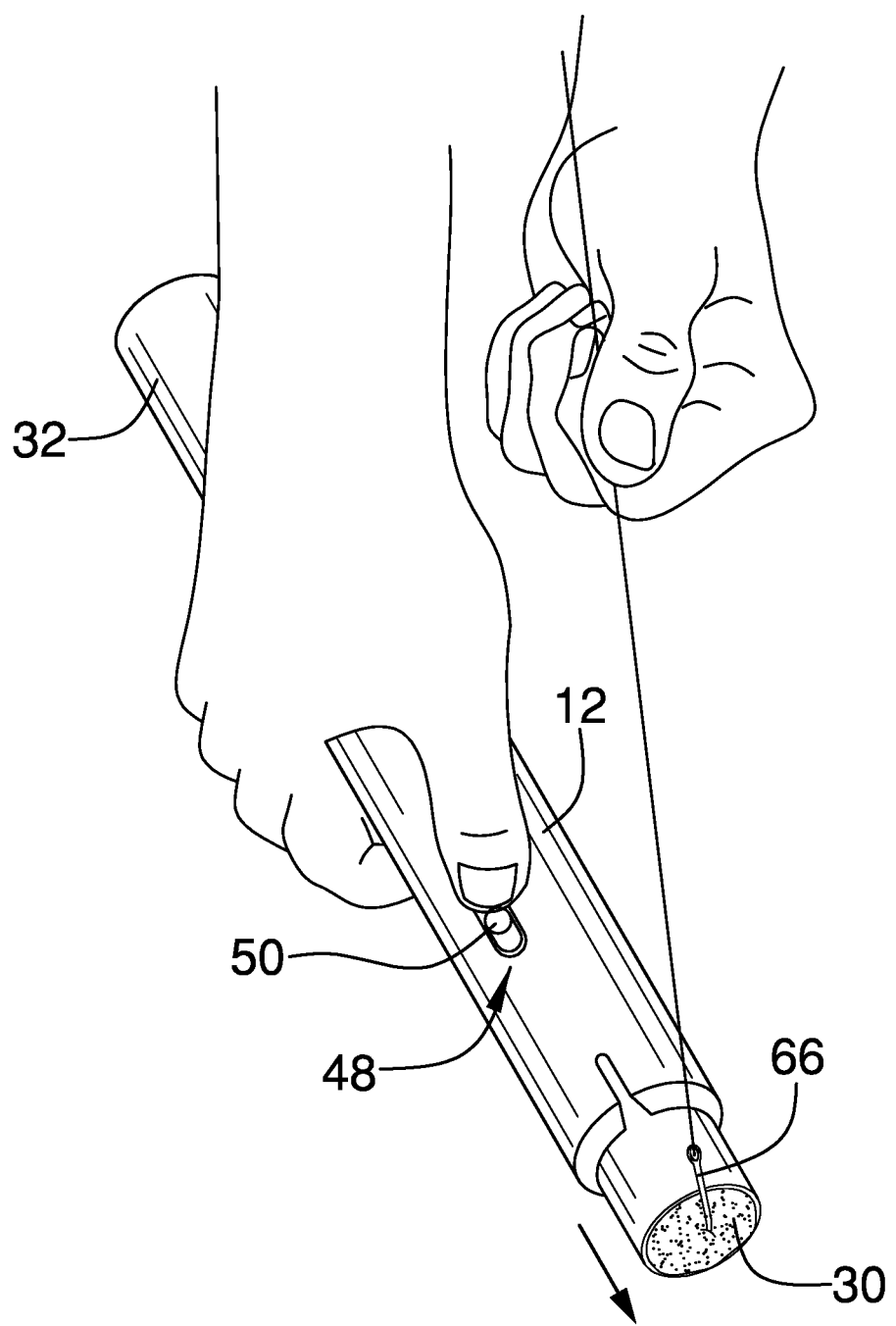
FIG. 6 is an in-use view of an embodiment of the disclosure.
Figure 7:
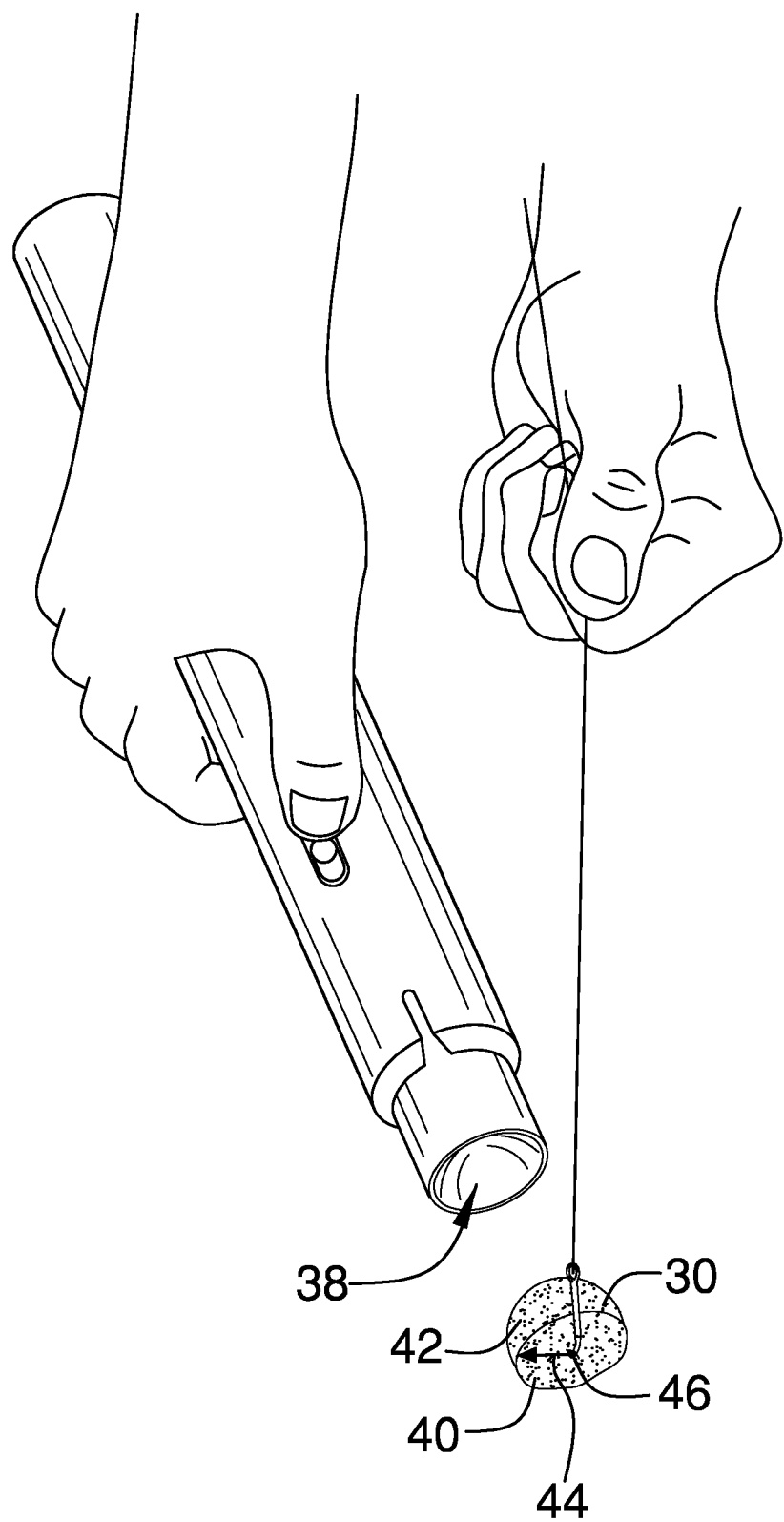
FIG. 7 is an in-use view of an embodiment of the disclosure.

With reference now to the drawings, and in particular to FIGS. 1 through 7 thereof, a new fishhook baiter embodying the principles and concepts of an embodiment of the disclosure and generally designated by the reference numeral 10 will be described.

As best illustrated in FIGS. 1 through 7, the fishing bait forming assembly and method 10 generally comprises a housing 12 enclosing an interior space 14 and having an interior surface 16 and an exterior surface 18. The housing 12 is elongated from a first end 20 to a second end 22, and the first 20 and second 22 ends are open. An edge 24 of the first end 20 may be beveled inwardly from the exterior surface 18 to the interior surface 16, wherein the edge 24 of the first end 20 is insertable into a quantity of gelatinous bait 26. The gelatinous bait 26 may typically be malodorous to define a stink bait.

A bait form 28 is mounted to the housing 12 and is configured for compressing a portion of the gelatinous bait 26 to form a compacted bait mass 30. The bait form 28 normally includes a press 32 being slidably positioned within the interior space 14 of the housing 12. The press 32 is elongated from a primary end 34 to a secondary end 36, wherein the primary end 34 and the secondary end 36 are each extendable outwardly from the housing 12. The primary end 34 of the press 32 is positioned proximate to the first end 20 of the housing 12, wherein the primary end 34 of the press 32 is insertable within gelatinous bait 26. A mold 38 is formed within the primary end 34 of the press 32 and is configured to compress the portion of gelatinous bait 26 within the mold 38 to define the compacted bait mass 30 removably positioned within the mold 38. The mold 38 is normally concavely shaped. The compacted bait mass 30 formed within the mold 38 will typically have a semispherical shape including a bottom surface 40 and a curved surface 42. A radius 44 measures from a center point 46 of the bottom surface 40 of the compacted bait mass 30 to the curved surface 42 of the compacted bait mass 30. The radius 44 may be from 0.25 inches to 0.75 inches, wherein the radius 40 is typically 0.50 inches.

A stop 48 is coupled to the press 32 and releasably holds the press 32 in a fixed position relative to the housing 12. The stop 48 is movable to release the press 32 from the fixed position relative to the housing 12. The stop 48 may comprise a rod 50 being coupled to the press 32 and extending outwardly therefrom. The stop 48 is slidably positioned within a path slot 52 extending through the exterior surface 18 and the interior surface 16 of the housing 12. The path slot 52 normally includes a first section 54, a second section 56, and a center section 58. The first 54 and second 56 sections each are orientated parallel to a longitudinal axis of the housing 12 extending through the first 20 and second 22 ends. The first section 54 is normally positioned nearer to the first end 20 than the second section 56. The first 54 and second 56 sections are laterally offset from each other and the center section 58 extends between the first 54 and second 56 sections to form a shoulder relative to the second end 22 of the housing 12. The primary end 34 of the press 32 is typically extended from the first end 20 of the housing 12 when the rod 50 is positioned within the first section 54 of the path slot 52. The primary end 34 of the press 32 is typically positioned within the interior space 14 of the housing 12 when the rod 50 is positioned within the second section 56 of the path slot 52. The primary end 34 is normally flush to the edge 24 of the first end 20 of the housing 12 when the rod 50 is positioned within the center section 58 of the path slot 52.

A seal 60 is positioned on and may be coupled to the interior surface 16 of the housing 12 and abuts an exterior surface 18 of the press 32 to inhibit the gelatinous bait 26 from moving between the interior surface 16 of the housing 12 and an outer surface 62 of the press 32 within the interior space 14. The seal 60 is typically positioned nearer to the first end 20 of the housing 12 than the second end 22. The seal 60 may comprise an O-ring or any other conventional seal 60 capable of blocking the gelatinous bait 26 from moving between the housing 12 and the press 32.

A hook slot 64 extends through the first end 20 of the housing 12 and through the exterior surface 18 and the interior surface 16 of the housing 12. The hook slot 64 is configured to receive a fishing hook 66 such that a bend of a fishing hook 66 is removably positioning in the hook slot 64 and a point of the fishing hook 66 is extended into the second end 22 of the housing 12, wherein the point of the fishing hook 66 is insertable into the compacted bait mass 30 formed within the mold 38 when the mold 38 is urged toward the fishing hook 66. The fishing hook 66 is typically positioned within the hook slot 64 when the primary end 34 of the press 32 is positioned within the interior space 14 of the housing 12 or when the primary end 34 is flush with the edge 24 of the first end 20 of the housing 12. The primary end 34 of the press 32 may be extended outwardly from the housing 12 after the fishing hook 66 has been positioned within the hook slot 64 to facilitate inserting the point of the fishing hook 66 into the compacted bait mass 30.

In use, the mold 38 extends outwardly of the housing 12 and into gelatinous bait 26 to capture and compress the portion of the gelatinous bait 26 into the compacted bait mass 30. The mold 38 is retracted inwardly towards the housing 12 and the fishing hook 66 is positioned within the hook slot 64 such that the fishing hook 66 extends into the housing 12 and is directed toward the compacted bait mass 30. The mold 38 extends toward the fishing hook 66 to engage the compacted bait mass 30 with the fishing hook 66. The compacted bait mass 30 is removed from the mold 38 with the fishing hook 66, wherein the compacted bait mass 30 is retained on the fishing hook 66.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing bait forming assembly comprising:
   a housing, said housing enclosing an interior space and having an interior surface and an exterior surface, said housing being elongated from a first end to a second end, said first and second ends being open;
   a bait form being mounted to said housing and being configured for compressing a portion of the gelatinous bait to form a compacted bait mass; and
   a hook slot extending through said first end of said housing and through said exterior surface and said interior surface of said housing;
   wherein an edge of said first end is beveled inwardly from said exterior surface to said interior surface, wherein said edge of said first end is insertable into a quantity of gelatinous bait;
   wherein said bait form includes a press being slidably positioned within said interior space of said housing, said press being elongated from a primary end to a secondary end, wherein said primary end and said secondary end are each extendable outwardly from said housing, said primary end of said press being positioned proximate to said first end of said housing, wherein said primary end of said press is insertable within gelatinous bait; and
   a seal being coupled to said interior surface of said housing and abutting an outer surface of said press, said seal inhibiting the gelatinous bait from moving between said interior surface of the housing and said exterior surface of the press within the interior space, said seal being positioned nearer to said first end of said housing than said second end, said seal comprising an O-ring.

2. The fishing bait forming assembly of claim 1, further including a mold being formed within said primary end of said press, said mold being configured to compress the portion of gelatinous bait within said mold to define the compacted bait mass removably positioned within said mold, said mold being concavely shaped.

3. The fishing bait forming assembly of claim 2, wherein said hook slot being configured to receive a fishing hook such that a bend of a fishing hook is removably positioning in said hook slot and a point of the fishing hook is extended into said second end of said housing, wherein the point of the fishing hook is insertable into the compacted bait mass formed within said mold when said mold is urged toward the fishing hook.

4. A fishing bait forming assembly comprising:
a housing, said housing enclosing an interior space and having an interior surface and an exterior surface, said housing being elongated from a first end to a second end, said first and second ends being open;
a bait form being mounted to said housing and being configured for compressing a portion of the gelatinous bait to form a compacted bait mass; and
a hook slot extending through said first end of said housing and through said exterior surface and said interior surface of said housing;
wherein an edge of said first end is beveled inwardly from said exterior surface to said interior surface, wherein said edge of said first end is insertable into a quantity of gelatinous bait;
wherein said bait form includes a press being slidably positioned within said interior space of said housing, said press being elongated from a primary end to a secondary end, wherein said primary end and said secondary end are each extendable outwardly from said housing, said primary end of said press being positioned proximate to said first end of said housing, wherein said primary end of said press is insertable within gelatinous bait;
a mold being formed within said primary end of said press, said mold being configured to compress the portion of gelatinous bait within said mold to define the compacted bait mass removably positioned within said mold, said mold being concavely shaped; and
a stop being coupled to said press and releasably holding said press in a fixed position relative to said housing, said stop being movable to release said press from said fixed position relative to said housing, said stop comprising a rod being coupled to said press and extending outwardly therefrom, said stop being slidably positioned within a path slot extending through said exterior surface and said interior surface of said housing, said path slot including a first section, a second section, and a center section, said first and second sections each being orientated parallel to a longitudinal axis of said housing extending through said first and second ends, said first section being positioned nearer to said first end than said second section, said first and second sections being laterally offset from each other, said center section extending between said first and second sections and forming a shoulder relative to said second end of said housing.

5. A fishing bait forming assembly comprising:
a housing, said housing enclosing an interior space and having an interior surface and an exterior surface, said housing being elongated from a first end to a second end, said first and second ends being open, an edge of said first end being beveled inwardly from said exterior surface to said interior surface, wherein said edge of said first end is insertable into a quantity of gelatinous bait;
a bait form being mounted to said housing and being configured for compressing a portion of the gelatinous bait to form a compacted bait mass, said bait form including:
a press being slidably positioned within said interior space of said housing, said press being elongated from a primary end to a secondary end, wherein said primary end and said secondary end are each extendable outwardly from said housing, said primary end of said press being positioned proximate to said first end of said housing, wherein said primary end of said press is insertable within gelatinous bait;
a mold being formed within said primary end of said press, said mold being configured to compress the portion of gelatinous bait within said mold to define the compacted bait mass removably positioned within said mold, said mold being concavely shaped;
a stop being coupled to said press and releasably holding said press in a fixed position relative to said housing, said stop being movable to release said press from said fixed position relative to said housing, said stop comprising a rod being coupled to said press and extending outwardly therefrom, said stop being slidably positioned within a path slot extending through said exterior surface and said interior surface of said housing, said path slot including a first section, a second section, and a center section, said first and second sections each being orientated parallel to a longitudinal axis of said housing extending through said first and second ends, said first section being positioned nearer to said first end than said second section, said first and second sections being laterally offset from each other, said center section extending between said first and second sections and forming a shoulder relative to said second end of said housing; and
a seal being coupled to said interior surface of said housing and abutting an exterior surface of said press, said seal inhibiting the gelatinous bait from moving between said interior surface of the housing and an outer surface of the press within the interior space, said seal being positioned nearer to said first end of said housing than said second end, said seal comprising an O-ring;
a hook slot extending through said first end of said housing and through said exterior surface and said interior surface of said housing, said hook slot being configured to receive a fishing hook such that a bend of a fishing hook is removably positioning in said hook slot and a point of the fishing hook is extended into said second end of said housing, wherein the point of the fishing hook is insertable into the compacted bait mass formed within said mold when said mold is urged toward the fishing hook.

* * * * *